United States Patent [19]

Jones

[11] Patent Number: 6,155,907

[45] Date of Patent: Dec. 5, 2000

[54] METHOD FOR HARDENING AND POLISHING CONCRETE FLOORS, WALLS, AND THE LIKE

[75] Inventor: Jerald W. Jones, Orem, Utah

[73] Assignee: Curecrete Chemical Company, Inc., Springville, Utah

[21] Appl. No.: 09/183,836

[22] Filed: Oct. 30, 1998

[51] Int. Cl.⁷ ........................................................ B24B 1/00
[52] U.S. Cl. .............................. 451/28; 451/60; 451/353; 451/58; 404/78; 52/741.15
[58] Field of Search .................................. 451/28, 41, 60, 451/58, 353, 36, 37; 404/78; 106/3; 52/741.15

[56] References Cited

U.S. PATENT DOCUMENTS

| | | |
|---|---|---|
| 165,898 | 7/1875 | Watson . |
| 1,965,299 | 7/1934 | Patterson . |
| 2,196,992 | 4/1940 | Keller . |
| 3,540,891 | 11/1970 | Muhler . |
| 3,615,305 | 10/1971 | Muhler . |
| 3,685,218 | 8/1972 | Gambale et al. . |
| 4,565,644 | 1/1986 | Smith et al. . |
| 4,699,807 | 10/1987 | Howell . |
| 4,910,824 | 3/1990 | Nagayama et al. ........................ 15/98 |
| 5,016,310 | 5/1991 | Geyer et al. .............................. 15/49.1 |
| 5,026,421 | 6/1991 | Le Loarer et al. . |
| 5,057,152 | 10/1991 | Marcus et al. . |
| 5,174,813 | 12/1992 | Cifuentes et al. . |
| 5,191,002 | 3/1993 | Davis . |
| 5,203,046 | 4/1993 | Shaw .......................................... 15/98 |
| 5,309,592 | 5/1994 | Hiratsuka ................................ 15/49.1 |
| 5,454,751 | 10/1995 | Wiand . |
| 5,605,493 | 2/1997 | Donatelli . |

*Primary Examiner*—David A. Scherbel
*Assistant Examiner*—George Nguyen
*Attorney, Agent, or Firm*—Thorpe, North & Western LLP

[57] ABSTRACT

A method of both hardening and polishing a concrete surface includes the steps of first applying to the concrete surface a hardening/densifying silicate compound, allowing the compound to remain in contact with the surface for a period of time sufficient to allow it to soak into the surface of the concrete, cleaning the surface and allowing it to dry, and polishing the surface with a diluted silicate polishing compound. The polishing step includes the steps of applying to the concrete surface a diluted silicate polishing compound, mechanically polishing the concrete surface with a rotary polishing machine, using pads or disks or drums, cleaning the concrete surface, and repeating said steps with polishing pads or disks of increasingly finer grit until the surface obtains an aesthetically desirable level of shine.

20 Claims, No Drawings

METHOD FOR HARDENING AND POLISHING CONCRETE FLOORS, WALLS, AND THE LIKE

BACKGROUND OF THE INVENTION

1. Field of the Invention

The present invention relates to a method for polishing concrete surfaces. More particularly, the present invention relates to an improved method for polishing and repairing concrete walls, floors, and the like.

2. State of the Art

Concrete is one of the most widely used construction materials. Because of its strength, durability, ease of manufacture, ease of installation, and relatively low cost, it is frequently the material of choice for floors, walls, and the like. However, there are many instances where it is desirable to have a floor or wall surface with a pleasing high gloss finish or shine. In such cases, concrete may be overlooked in favor of other more high cost materials such as marble, stone, terrazo, etc.

There are a number of known methods of cleaning and polishing marble and stone surfaces. For example, U.S. Pat. No. 5,605,493 to Donatelli et al. discloses a fairly typical method for stone polishing including the steps of applying a solution to a stone floor, mechanically polishing with a rotary disk, and removing the slurry. Similarly, U.S. Pat. No. 5,454,751 to Wiand discloses an abrasive rotary polishing disk designed to resist damage from ridges, bumps, and other floor irregularities. These prior art devices and methods deal exclusively with stone floors of various kinds, and do not address the polishing of concrete. Moreover, while these known devices and methods anticipate the use of a liquid lubricant of some kind during polishing to create a slurry.

The use of silicates as abrasives is also well known. For example, U.S. Pat. No. 4,565,644 to Smith et al. discloses a floor cleaning and waxing composition which may include silicate abrasives. U.S. Pat. No. 5,191,002 to Davis discloses a floor care maintenance system including a floor finish stripper containing sodium metasilicate. U.S. Pat. No. 1,965,299 to Patterson discloses an abrading and polishing composition for enamels, lacquers, etc., which may include a silicate abrasive agent. U.S. Pat. No. 2,196,992 to Keller discloses a metal polish which contains sodium silicate. U.S. Pat. No. 3,540,891 to Muhler discloses a household cleaning and polishing composition containing zirconium silicate. U.S. Pat. No. 3,615,305 to Muhler discloses a dental amalgam polishing composition containing stannous silicate. U.S. Pat. No. 3,685,218 to Gamble discloses a glass polishing composition containing zirconium silicate. Notably, none of these prior art methods mention or suggest the use of silicates as a polishing compound for concrete.

OBJECTS AND SUMMARY OF THE INVENTION

It is an object of this invention to provide a method of mechanically polishing a concrete surface to obtain an aesthetically pleasing high gloss using a silicate polishing solution.

It is also an object of the present invention to provide a method of internally densifying and hardening a concrete surface using silicate based compounds.

It is another object of this invention to provide a method of honing, smoothing, and polishing a rough concrete surface using silicate based compounds.

The above and other objects are realized in a specific illustrative embodiment of a method of hardening and polishing concrete surfaces. This method includes the steps of first densifying and hardening the concrete surface by a silicate based hardening/densifying compound, allowing the hardening/densifying compound to remain in contact with surface for a period of time sufficient to allow it to soak into the surface of the concrete, cleaning the surface and allowing it to dry, secondly polishing the surface with a diluted silicate polishing compound. The surface polishing step includes applying to a concrete surface a diluted silicate polishing compound, mechanically polishing the concrete surface with a rotary, drum or disc polishing machine, cleaning the concrete surface, and then repeating the above steps with polishing pads or discs, of increasingly finer grit until the surface obtains an aesthetically desirable level of shine.

In accordance with another aspect of the invention, a rough concrete surface may be honed and polished by the steps of cleaning the surface, honing the surface with a rough grit honing disk so as to produce a smooth even surface, using water as a lubricant, cleaning the surface and allowing it to dry, applying to the concrete surface a silicate hardening/densifying compound, allowing the silicate hardening/densifying compound to remain in contact with the surface for a period of time sufficient to allow the compound to soak into the surface of the concrete, allowing the surface to dry thoroughly, removing any puddles, mechanically polishing the concrete surface, cleaning the surface, and polishing the surface with a diluted silicate polishing compound as described above.

Other objects and features of the invention will be apparent to those skilled in the art, based on the following description.

DETAILED DESCRIPTION OF THE PREFERRED EMBODIMENT

A concrete surface, such as a floor or wall, may be polished in accordance with the present invention once it has cured sufficiently. Adequate curing usually requires at least 28 days after the concrete is placed, though the time may vary depending on environmental conditions, the particular concrete mix, and whether any additives such as fast-setting admixture have been used. The general process involves first applying to the concrete a silicate-based hardening/densifying compound. This compound, in solution, is applied to the concrete surface at a suitable rate to completely wet the surface, and is allowed to remain in contact with the surface for a period of time sufficient to allow the compound to fully soak into the surface of the concrete. The excess solution is then removed and the surface allowed to thoroughly dry. Once dry, a solution of diluted silicate compound is applied to the surface to form a polishing slurry as the surface is buffed or polished using for example, a rotary polishing machine. In the preferred embodiment of the present invention, the hardening/densifying solution is composed of water to silicate compound ration of 3 to 1, while the diluted silicate polishing compound comprises water and silicate compound in a ratio of approximately 10 to 1. Exemplary silicate compounds suitable for use in both the hardening and polishing steps include, among others, sodium silicate, zinc fluosilicate and magnesium fluosilicate. Other silicate compounds may also be used, but a preferred silicate compound is sodium silicate. Suitable rotary polishing machines are well known in the industry, and typically incorporate circular abrasive pads, or disks or drums which mount to the bottom of the machine. Suitable pads, or disks include Turbo Spiral made by VMC Technical Assistance Corporation, and may comprise diamond-impregnated abrasive disks or drums.

To adequately polish the surface following this method, it is usually required to pass over the surface with the rotary polishing machine so as to allow the rotating disk, pad or drum to contact all areas of the surface at least twice. Alternatively, three passes in alternatingly perpendicular directions may be used to obtain superior results. During polishing there should be a continuous flow of polishing compound to adequately lubricate the polishing action and impart desired shine to the surface. When the appropriate passes have been made over a given surface, the surface is cleaned; the surface may be inspected to determine whether the desired level of shine has been achieved. The surface must be dry in order to see its true shine and appearance.

If the desired level of shine has not been achieved, the above process is repeated using abrasive pads of less grit each time, and cleaning the surface between each repetition of the process. If the floor is not cleaned between each repetition of the process, excessive wear of the polishing disk will occur. As is well known in the industry, the coarseness of abrasives is indicated by numbers, with lower numbers representing coarser grit, and higher numbers representing finer grit. A typical concrete surface in good condition may be initially polished with 120 to 800 grit pads, disks or drums depending on the desired sheen. With each successive repetition of the polishing process, the grit of the pads will typically be increased by 200 each time. A satisfactorily high gloss may be obtained with pads, disks or drums of anywhere from 800 to 1800 grit, depending on one's preferred level of shine.

Alternatively, a rough or damaged concrete surface may need to be honed before the polishing process is possible. The surface must first be cleaned, then honed with a 50 or 120 grit rotary grinding disk using at least two passes. Water is used as a lubricant to produce a slurry. This process may require more passes or graduation from one grit level to another—with cleaning in between—as described above. Once the surface has become smooth and even, a silicate hardening/densifying compound (described earlier) is applied to the surface and allowed to soak into it. This compound will preferably be applied at a rate of one gallon per 40 to 200 square feet, and will be allowed to soak into the surface for approximately 30 minutes without being removed, and without additional water being used, though any puddles should be removed. The surface should be allowed to dry completely before polishing begins. The surface is then polished as described above starting with a 50 grit pad, disk or drum then stepping up to 220 or 600 grit, and so on until the desired shine is achieved, using a continuous flow of diluted silicate polishing compound (diluted 10:1 with water as described above) with each grit, and always removing the slurry between polishing stages.

An abnormally porous, soft, or carbonated, concrete surface may need to be honed before polishing is possible. In such case, the surface must first be cleaned, then honed with a 50 or 120 grit rotary grinding disk using at least two passes. Water is used as a lubricant to produce a slurry. This process may require more passes and/or graduation from one grit level to another, with cleaning in between, as described above. Once the soft surface has been removed and the remaining surface has become smooth and even, a silicate hardening/densifying compound (described earlier) is applied to the surface and allowed to soak into it. This compound is preferably applied at a rate of one gallon per 40 to 200 square feet, and is allowed to soak into the surface for approximately 30 minutes without being removed, and without additional water being use, though any puddles should be removed. The surface is allowed to dry completely before polishing begins. The surface is then polished as described above starting with a 50 grit pad, and stepping up to 440 or 600 grit, and so on until the desired shine is achieved, using a continuous flow of diluted silicate polishing compound (diluted 10:1 with water as described above) with each grit, and always removing the slurry between polishing stages.

In the manner described, a concrete surface may be hardened and polished to a high gloss finish or shine.

It is to be understood that the above-described arrangements are only illustrative of the application of the principles of the present invention. Numerous modification and alternative arrangements may be devised by those skilled in the art without departing from the spirit and scope of the present invention and the appended claims are intended to cover such modifications and arrangements.

What is claimed is:

1. A method of hardening and polishing a concrete surface comprising the steps of:
    (a) applying to the concrete surface a hardening/densifying silicate compound;
    (b) allowing the compound to remain in contact with the surface for a period of time sufficient to allow the compound to soak into the surface of the concrete;
    (c) removing any puddles and allowing the surface to dry;
    (d) applying to the concrete surface a diluted silicate polishing compound; and
    (e) mechanically polishing the concrete surface.

2. The method as described in claim 1 wherein the hardening/densifying silicate compound is applied at a rate of about one gallon per 40 to 20 square feet of concrete surface.

3. The method as described in claim 1 wherein the hardening/densifying silicate compound is allowed to remain in contact with the concrete surface for a period of from 30 to 60 minutes.

4. The method as described in claim 1 wherein the diluted silicate polishing compound comprises water and silicate compound in a ratio of approximately 10 to 1.

5. The method as described in claim 1 wherein the hardening/densifying silicate compound comprises water and silicate compound in a ration of approximately 3 to 1.

6. The method as described in claim 1 wherein the diluted silicate polishing compound comprises water and silicate compound in a ratio of approximately 10 to 1.

7. The method as described in claim 1 wherein the surface is mechanically polished by means of a rotating polishing disk, drum or pad.

8. The method as described in claim 1 wherein the silicate compounds are selected from the group consisting of sodium silicate, zinc fluorosilicate, and magnesium fluorosilicate.

9. A method of polishing a concrete surface comprising the steps of:
    (a) applying to the concrete surface a diluted silicate polishing compound;
    (b) mechanically polishing the concrete surface to which the compound has been applied;
    (c) cleaning the concrete surface;
    (d) applying to the concrete surface more of said diluted silicate polishing compound;
    (e) mechanically polishing the concrete surface with a rotating polishing pad, disk, or drum having a less rough grit than was used in the previous polishing step; and (f) repeating steps (c) through (e) until, upon cleaning, the surface has the desired level of shine.

10. The method as described in claim 9 wherein the diluted silicate polishing compound comprises water and silicate compound in a ratio of approximately 10 to 1.

11. The method as described claim 9 wherein the diluted silicate polishing compound is applied at a rate of one gallon per 100 to 300 square feet of concrete surface.

12. The method as described in claim 9 wherein the surface is mechanically polished by means of a rotating polishing disk, drum or pad.

13. The method as described in claim 9 wherein said polishing pads, disks, or drums are in a grit coarseness range of about 50 to 1800.

14. A method of honing and polishing a rough, irregular concrete surface comprising the steps of:

(a) cleaning the surface;

(b) honing the surface with a rough grit honing disk, using water as a lubricant, so as to produce a substantially smooth, even surface;

(c) cleaning the surface and allowing it to dry;

(d) applying to the concrete surface a hardening/densifying silicate compound;

(e) allowing the hardening/densifying silicate compound to remain in contact with the surface for a period of time sufficient to allow the silicate hardening/densifying compound to soak into the surface of the concrete;

(g) mechanically polishing the concrete surface.

15. The method described in claim 14 wherein the surface is mechanically polished by means of a rotating polishing disk, drum or pad.

16. The method described in claim 14 further comprising the steps of:

(h) cleaning the concrete surface;

(i) applying to the concrete surface a diluted silicate polishing compound;

(j) mechanically polishing the concrete surface with a rotating polishing pad, disk or drum having a less rough grit than was used in the previous polishing step; and (k) repeating steps (h) through (j) until, upon cleaning, the surface has the desired level of shine.

17. The method as described in claim 16, further comprising removing existing coating before honing and polishing the surface, said method comprising the preliminary steps of:

(i) abrading the surface with a coarse rotating grinder disk; and (ii) applying a chemical stripper to remove any remaining part of the coating.

18. The method described in claim 17 wherein the surface is mechanically polished by means of a rotating polishing disk or drum or pad.

19. The method described in claim 18 wherein said polishing pads, disks or drums are in a grit coarseness range of about 50 to 800.

20. A method of removing and leveling soft, porous, carbonated concrete from a surface and polishing the surface, said method comprising the steps of:

(a) abrading and removing the soft surface with a coarse rotating grinder;

(b) cleaning the surface and allowing it to dry;

(c) applying to the concrete surface a silicate hardening/densifying compound;

(d) allowing the silicate hardening/densifying compound to remain in contact with the surface for a period of time sufficient to allow the silicate hardening/densifying compound to soak into the surface of the concrete;

(e) allowing the surface to dry thoroughly, removing any puddles;

(f) mechanically polishing the concrete surface;

(g) cleaning the concrete surface;

(h) applying to the concrete surface a diluted silicate polishing compound;

(i) mechanically polishing the concrete surface with a rotating polishing pad, disk or drum having a less rough grit than was used in the previous polishing step; and (j) repeating steps (f) through (h) until, upon cleaning, the surface has the desired level of shine.

* * * * *